United States Patent [19]

Andrevski

[11] Patent Number: 4,642,692
[45] Date of Patent: Feb. 10, 1987

[54] LENS-TO-PRISM MOUNTING STRUCTURE

[75] Inventor: Zygmunt M. Andrevski, Mercer County, N.J.

[73] Assignee: RCA Corporation, Princeton, N.J.

[21] Appl. No.: 750,153

[22] Filed: Jul. 1, 1985

[51] Int. Cl.$^4$ .............................................. H04N 5/30
[52] U.S. Cl. .................................... 358/229; 352/139
[58] Field of Search ....................... 358/225, 228, 229; 354/288, 476; 352/139, 140, 231

[56] References Cited

U.S. PATENT DOCUMENTS

| | | | |
|---|---|---|---|
| 4,057,837 | 11/1977 | Needs et al. | 358/254 |
| 4,237,480 | 12/1980 | Franken et al. | 358/55 |
| 4,275,412 | 6/1981 | Contant | 358/55 |
| 4,318,133 | 3/1982 | Ohtake | 358/229 |
| 4,375,653 | 3/1983 | Staley | 358/229 |

Primary Examiner—Michael L. Gellner
Assistant Examiner—Brian W. Brown
Attorney, Agent, or Firm—Eugene M. Whitacre; Peter M. Emanual; James B. Hayes

[57] ABSTRACT

A television camera support for mounting and providing optical alignment between the imaging axes of a lens and an image pickup apparatus. The support is of single-piece construction and generally "L" shaped and includes a vertical portion adapted to receive the camera lens and a horizontal portion adapted to receive the image pickup apparatus. In a preferred embodiment, only the vertical portion of the support is attached to the body of the television camera and the structural rigidity of the camera body near the point of attachment is less than the rigidity of the support, thereby minimizing misalignment of the imaging axes if excessive forces are accidentally applied to the lens.

6 Claims, 6 Drawing Figures

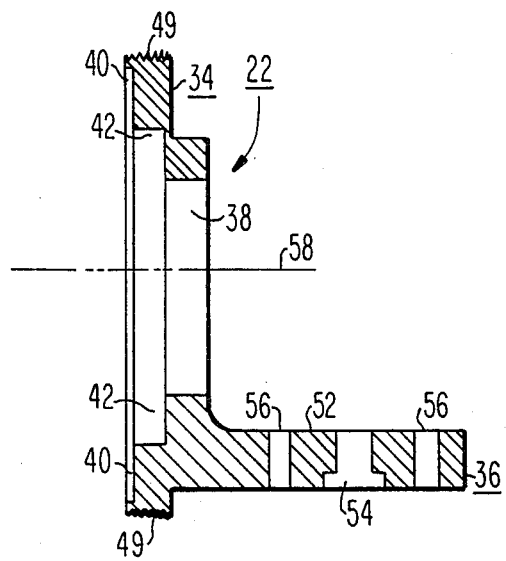
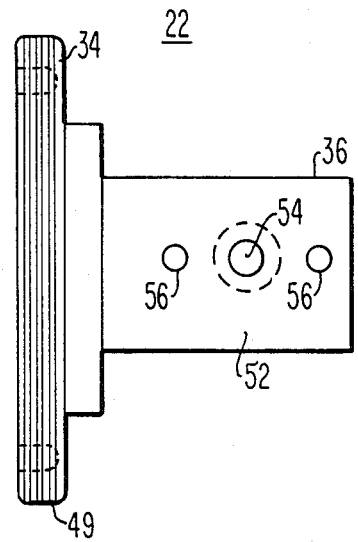
Fig. 3(a)　　　Fig. 3(b)
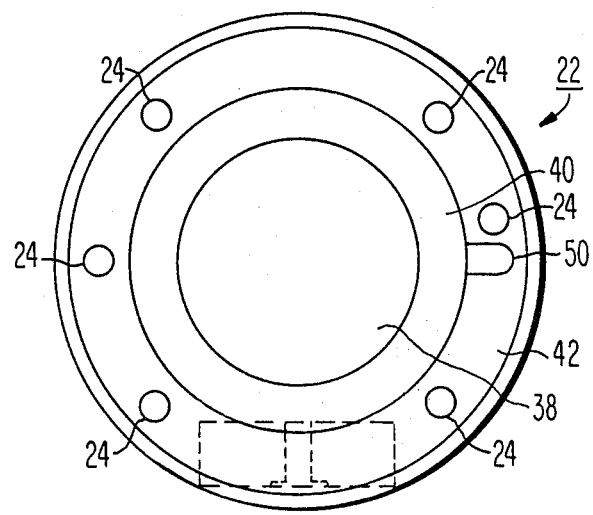
Fig. 3(c)

LENS-TO-PRISM MOUNTING STRUCTURE

FIELD OF THE INVENTION

This invention relates to a mounting support for a television camera which maintains optical alignment between the camera lens and an associated image pickup device.

BACKGROUND OF THE INVENTION

Prior art television cameras including image pickup tubes have support structure for holding the image pickup tube such that its optical axis is generally in alignment with the optical axis of the objective lens. The support structure includes image pickup tube holding means which is releasable, so that when the image pickup tube becomes inoperative, due to its relatively short average lifetime or premature accidental burn-out, it can be easily replaced. Precise registration of the optical axis of the pickup tube with the optical axis of the lens (or other pickup tubes) is not conventionally established by the support structure and its releasable holding means, but is instead accomplished by fine adjustment of the horizontal and vertical deflection signals used for scanning a raster on the pickup tube. This adjustment of the deflection signals is performed at the time of camera manufacture and again if an image pickup tube has been replaced. Furthermore, if the optical alignment of the image pickup tube becomes offset, due to for example an impact on the camera lens or body, adjustment of the deflection signals can usually be performed for reestablishing the required optical alignment.

With the advent of television solid-state imagers having a relatively long operating lifetime, a releasable holding means for supporting the imager is generally not required. Furthermore, solid-state imagers have an alignment requirement within a one micron ($1 \times 10^{-6}$ meters) range, thereby making a releasable holding means which can maintain tight alignment tolerances practically impossible to achieve. For best optical alignment and stability, it is desirable to bond an imager, or a beamsplitter including a plurality of imagers, directly to the objective lens. However, this is not practical in typical television cameras due to the requirement of providing for interchangeability of objective lenses.

Thus, it is desirable to provide a precision mounting arrangement for a television camera lens and solid-state imager which is relatively simple to manufacture and assemble and which can reliably maintain the required precision alignment over the useful lifetime of the camera.

SUMMARY OF THE INVENTION

In accordance with the principles of the present invention a television camera comprises a camera enclosure including a front plate having an opening dimensioned to pass an image supplied from one end of a lens and a mounting support of single-piece, i.e., integral construction having a first portion including an opening therein and about the periphery of which is formed means adapted to receive the image supplying end of the lens and a second portion protruding substantially orthogonal from the first portion and including a mounting surface formed on one side thereof to receive an image pickup arrangement for coaxially aligning an input optical axis of the pickup arrangement with the optical axis of the lens. The first portion of the mounting support is directly attached to the front plate of the camera such that the central axis of the openings therein are coaxially aligned. In a preferred embodiment, the structural rigidity of the front plate is substantially less than the structure rigidity of the mounting support, such that if a bending moment is applied to the support, e.g., via the lens, the front plate tends to distort rather than the mounting support, thereby maintaining the alignment provided by the mounting support between the optical axes of the supplied image and the image pickup arrangement.

BRIEF DESCRIPTION OF THE DRAWINGS

FIGS. 3 (*a*) (*b*) and (*c*) are side-sectional, top and front views, respectively, of the optical support structure illustrated in FIG. 1.

FIGS. 2 and 3 illustrate portions of FIG. 1 in greater detail and should be referred to during the following description. Consistent reference numbers are used throughout FIGS. 1, 2 and 3 when referring to similar elements.

DETAILED DESCRIPTION OF THE INVENTION

Figure 1:
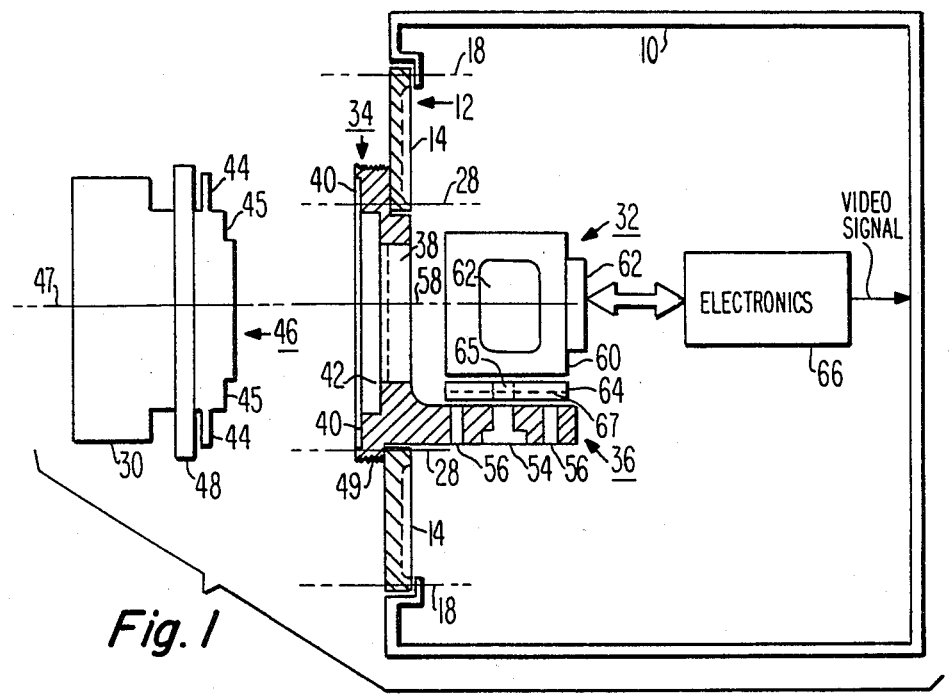
FIG. 1 is a partial section view of a television camera including optical support structure which is constructed in accordance with the principles of the present invention.
Figure 2A:
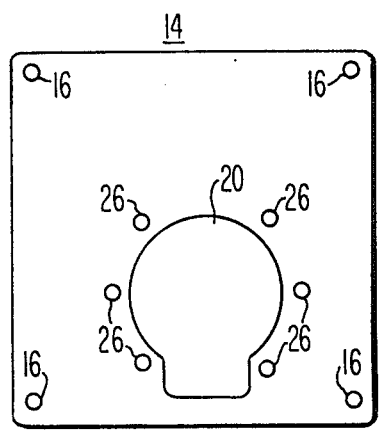
FIGS. 2 (*a*) and (*b*) are front and back views, respectively, of a camera front plate illustrated in FIG. 1.

In FIG. 1, a television camera body 10 includes an opening 12 having a periphery which supports a front plate 14. Plate 14, shown in detail in FIGS. 2(*a*) and (*b*), includes mounting holes 16 about its periphery which are aligned, as indicated by lines 18, with corresponding holes (not shown) about the periphery of opening 12, such that suitable attaching elements, such as bolts (not shown), can secure front plate 14 to camera body 10. An opening 20 in front plate 14 is dimensioned to receive a lens and beamsplitter mounting support 22 (shown in detail in FIGS. 3(*a*), (*b*) and (*c*)). Support 22 includes mounting holes 24, shown in FIG. 3(*c*) located about its periphery which are aligned with corresponding holes 26 in front plate 14, shown in FIGS. 2(*a*) and 2(*b*) as indicated by lines 28 in FIG. 1, such that suitable attaching elements, such as bolts (not shown) can secure support 22 to front plate 14.

In accordance with principles of the invention, as illustrated in FIG. 1 and in detail in FIGS. 3(*a*), (*b*) and (*c*), support 22 is a single precision support which maintains alignment between an objective lens 30 and a solid-state image pickup arrangement 32. More specifically, support 22 is substantially L-shaped and includes a vertical portion 34 and a horizontal portion 36. Portion 34 includes an opening 38 and recesses 40 and 42 which are machined therein to receive flanges 44 and a shoulder portion 45, respectively, of an image supplying end 46 of objective lens 30 and establish coaxial alignment of the optical axis 47 of lens 30 with the center of opening 38. A ring 48 located around lens 30 includes a threaded interior periphery which engages corresponding threads 49 about the periphery of vertical portion 34, more clearly shown in FIG. 3(*b*), and which, when tightened, bears against flanges 44 for releasably, but precisely, securing lens 30 to support 22. Furthermore, as shown in FIG. 3c, recess 42 includes a cutout (or notch) 50 for engaging an alignment pin provided in standard bayonet mount television lenses for ensuring proper alignment.

As shown in FIGS. 3(a) and (b), horizontal portion 36 of support 22 includes a reference face 52 and mounting holes 54 and 56 therein for securing image pickup arrangement 32 (shown in FIG. 1) such that an input optical axis 58 of image pickup assembly 32 is coaxial with the center of opening 38, and therefore in precise alignment with optical axis 47 of lens 30.

As shown in FIG. 1, image pickup assembly 32 includes a light-splitting prism assembly 60 for splitting light received from lens 30 into three differently colored images which are each focused on a respective one of several solid-state imagers 62. Imagers 62 may comprise charge coupled device (CCD) imagers which can be directly bonded to prism assembly 60, such as described in U.S. Pat. No. 4,323,918 issued to S. L. Bendell, or bonded as described in U.S. patent application Ser. No. 595,528 entitled TELEVISION CAMERA WITH SOLID-STATE IMAGERS MOUNTED TO A PRISM filed in the name of the present inventor and assigned, like the present application, to RCA Corporation. A block 64 is bonded to the underside of prism assembly 60 and includes a threaded hole 65, shown in dashed lines, which aligns with hole 54 of portion 36 for securing image pickup assembly 32 to support 22. A channel (shown by dashed line 67) in the underside of block 64, engages alignment pins (not shown) which are fit into holes 56 of portion 36 for facilitating proper optical alignment of image pickup assembly 32.

Conventional camera electronics 66 supplies operating signals to imagers 62 and processes the charge samples supplied by the imagers for developing at its output a conventional video signal.

Thus, what has been described is a mounting arrangement of single-piece construction, i.e., support 22, for supporting and maintaining optical alignment between a lens and an image pickup arrangement in a television camera. Since support 22 is of single-piece construction, no assembly is required for its manufacture and interconnections, which may become loose and adversely affect the optical alignment, are not necessary. Additionally, since it is very simple, it is inexpensive to manufacture. Since optical support 22 is homogeneous, i.e., constructed of only one type of material, there is an assured match of thermal expansion for the support structure, thereby reducing adverse affects of temperature on the stability of the optical alignment. Since the lens mount is formed in support 22, once the image pickup assembly is mounted thereon, the optical alignment of the television camera is assured. Thus, if a television camera develops an inoperative imager, repair can quickly and reliably be performed by uncoupling the television lens and simple substitution of another support including a replacement optical assembly mounted thereon.

Figure 2B:
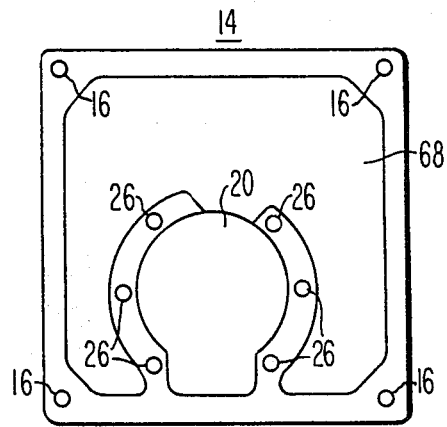

In accordance with a further aspect of the invention, as illustrated in FIG. 2(b), a substantial portion 68 of front plate 14 is thinner and therefore has less structural rigidity than mounting support 22. Thus, if a force is inadvertently applied to the lens 30 which causes a substantial bending moment at support 22, thinned front plate 14 will deform while the structural integrity and optical alignment provided by support 22 will be preserved. In this regard, in order to further preserve the structural integrity of support 22, only vertical portion 34, and not horizontal portion 36, of support 22 is attached to front plate 14.

What is claimed is:
1. A television camera comprising:
    a lens;
    an image pickup arrangement;
    a camera enclosure including a front plate portion including an opening dimensioned to pass an image supplied from one end of said lens;
    a mounting support of single piece construction having a first portion including an opening therein about the periphery of which is formed means adapted to receive the image supplying end of said lens for precisely positioning the optical axis of said supplied image and a second portion protruding substantially orthogonally from said first portion and including a mounting surface formed on one side thereof to receive said image pickup arrangement for coaxially aligning an input optical axis of said image pickup arrangement with the optical axis of said supplied image; and
    means for attaching said support to said camera enclosure front plate such that said openings therein are aligned.
2. The apparatus of claim 1 wherein said attaching means attaches only said first portion of said support to said camera enclosure front plate.
3. The apparatus of claim 2 wherein the structural rigidity of said front plate is less than the structural rigidity of said mounting support such that if a bending moment is applied to said support via said lens, said front plate tends to distort rather than said support, whereby the alignment provided by said support between the optical axes of said supplied image and said image pickup arrangement is maintained.
4. A generally L-shaped mounting support of single piece construction for precision mounting and alignment of the imaging axes of a lens and image pickup apparatus, comprising:
    a first generally planar portion having an opening therein and a lens positioning and attachment means formed about the periphery of said opening and adapted to receive said lens and position its imaging axis coaxially with a central axis of said opening; and
    a second portion protruding substantially orthogonally from said first portion from a point about the periphery of said opening in said first portion and having a mounting surface on one side thereof adapted to receive said image pickup apparatus thereon, such that when said image pickup apparatus is so mounted, its imaging axis is coaxial with the central axis of said opening in said first portion.
5. The apparatus of claim 4 further including:
    a camera body having an opening therein and including about the periphery of said opening means for providing attachment of said first portion of said generally L-shaped mounting support thereto.
6. The apparatus of claim 5 wherein the structural rigidity of said means for providing attachment is less than the structural rigidity of said mounting support such that if a bending moment is applied to said first portion of said support, said means for providing attachment tends to distort rather than said support, whereby the alignment provided by said support between the imaging axes of said lens and said image pickup apparatus is maintained.

* * * * *